(12) United States Patent
Luo

(10) Patent No.: US 10,754,467 B2
(45) Date of Patent: Aug. 25, 2020

(54) IRREGULAR-SHAPED DISPLAY PANEL AND DISPLAY DEVICE

(71) Applicant: XIAMEN TIANMA MICRO-ELECTRONICS CO., LTD., Xiamen (CN)

(72) Inventor: Xiaodong Luo, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/272,241

(22) Filed: Feb. 11, 2019

(65) Prior Publication Data

US 2020/0167031 A1 May 28, 2020

(30) Foreign Application Priority Data

Nov. 26, 2018 (CN) .......................... 2018 1 1417632

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ......... G06F 3/0416; G06F 3/0412–044; G02F 1/13338; G02F 1/134309; G02F 1/13439; G02F 1/1362; G02F 1/136204
See application file for complete search history.

(56) References Cited

U.S. PATENT DOCUMENTS

| | | | | |
|---|---|---|---|---|
| 2010/0073319 A1* | 3/2010 | Lyon | ...................... | G06F 3/044 345/174 |
| 2018/0067599 A1* | 3/2018 | Cai | ........................ | G06F 3/0416 |
| 2018/0129111 A1* | 5/2018 | Wu | ..................... | G02F 1/13338 |
| 2019/0332202 A1* | 10/2019 | Huang | ................... | G06F 3/0412 |
| 2019/0369787 A1* | 12/2019 | Park | ........................ | G06F 3/047 |
| 2019/0377448 A1* | 12/2019 | Liu | ........................ | G06F 3/0412 |
| 2020/0012364 A1* | 1/2020 | Ye | ........................... | G06F 3/044 |

FOREIGN PATENT DOCUMENTS

| | | | |
|---|---|---|---|
| CN | 106959784 A | | 7/2017 |
| CN | 107291303 A | * | 10/2017 |
| CN | 107885399 A | | 4/2018 |

* cited by examiner

*Primary Examiner* — Temesghen Ghebretinsae
*Assistant Examiner* — Ivelisse Martinez Quiles
(74) *Attorney, Agent, or Firm* — Anova Law Group PLLC

(57) ABSTRACT

A display panel comprises a display area including touch control signal lines and touch control electrodes, and a non-display area. The display area includes at least one notch, a first display area and a second display area. The touch control electrodes include first touch control electrodes and second touch control electrodes disposed at the first display area and the second display area, respectively. The touch control signal lines include first touch control signal lines and second touch control signal lines disposed at the first display area. A first touch control electrode is electrically connected to at least one first touch control signal line, and a second touch control electrode is electrically connected to at least one second touch control signal line via a connecting portion.

18 Claims, 11 Drawing Sheets

IRREGULAR-SHAPED DISPLAY PANEL AND DISPLAY DEVICE

CROSS-REFERENCES TO RELATED APPLICATIONS

This application claims the priority of Chinese Patent Application No. CN201811417632.2, filed on Nov. 26, 2018, the entire contents of all of which are incorporated herein by reference.

FIELD OF THE DISCLOSURE

The present disclosure generally relates to the display technology and, more particularly, relates to a display panel and a display device thereof.

BACKGROUND

Existing display devices, such as displays, televisions, mobile phones, tablets, etc., often have generally regular rectangular screens. With continuous development of display technology, user demands on the appearance of display devices are becoming diversified. The shape of the display panel may be often designed as a shape other than a regular rectangle, such as a convex polygon, a concave polygon, a circle, a ring, etc., and such a display panel may be often referred to as an irregular-shaped display panel. The shape of the irregular-shaped display panel may be able to bypass some functional modules in the display device, such as a camera module, a sensor module or a speaker module, thereby improving the screen-to-body ratio of the display device and, accordingly, enhancing the display performance. How to design an irregular-shaped display panel with excellent performance and continuously improve the user experience may be an important technical problem to be solved in the industry.

The disclosed display panel and display device thereof are directed to solve one or more problems set forth above and other problems.

BRIEF SUMMARY OF THE DISCLOSURE

One aspect of the present disclosure provides a display panel The display panel comprises a display area including a plurality of touch control signal lines extending along a first direction and a plurality of touch control electrodes arranged in an array, wherein a touch control electrode is electrically connected to at least one of the plurality of touch control signal lines; and a non-display area surrounding the display area and including a driving circuit electrically connected to one end of a touch control signal line. The display area includes at least one notch, a first display area and a second display area, and the first display area and the at least one notch are arranged along a second direction. The at least one notch has a first side far away from the driving circuit and an opposing second side, and the second display area is disposed at the first side of the at least one notch. The second display area and the at least one notch are arranged along the first direction, and the first direction intersects the second direction. The plurality of touch control electrodes include a plurality of first touch control electrodes disposed at the first display area and a plurality of second touch control electrodes disposed at the second display area. The plurality of touch control signal lines include a plurality of first touch control signal lines and a plurality of second touch control signal lines disposed at the first display area. A first touch control electrode is electrically connected to at least one of the plurality of first touch control signal lines, and a second touch control electrode is electrically connected to at least one of the plurality of second touch control signal lines via a connecting portion.

Another aspect of the present disclosure provides a display device. The display device comprises a display panel. The display panel comprises a display area including a plurality of touch control signal lines extending along a first direction and a plurality of touch control electrodes arranged in an array, wherein a touch control electrode is electrically connected to at least one of the plurality of touch control signal lines; and a non-display area surrounding the display area and including a driving circuit electrically connected to one end of a touch control signal line. The display area includes at least one notch, a first display area and a second display area, and the first display area and the at least one notch are arranged along a second direction. The at least one notch has a first side far away from the driving circuit and an opposing second side, and the second display area is disposed at the first side of the at least one notch. The second display area and the at least one notch are arranged along the first direction, and the first direction intersects the second direction. The plurality of touch control electrodes include a plurality of first touch control electrodes disposed at the first display area and a plurality of second touch control electrodes disposed at the second display area. The plurality of touch control signal lines include a plurality of first touch control signal lines and a plurality of second touch control signal lines disposed at the first display area. A first touch control electrode is electrically connected to at least one of the plurality of first touch control signal lines, and a second touch control electrode is electrically connected to at least one of the plurality of second touch control signal lines via a connecting portion.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which may be illustrated in the accompanying drawings. Hereinafter, embodiments consistent with the disclosure will be described with reference to drawings. Wherever possible, the same reference numbers will be used throughout the drawings to refer to the same or like parts. It may be apparent that the described embodiments may be some but not all of the embodiments of the present disclosure. Based on the disclosed embodiments, persons of ordinary skill in the art may derive other embodiments consistent with the present disclosure, all of which may be within the scope of the present disclosure. Further, in the present disclosure, the disclosed embodiments and the features of the disclosed embodiments may be combined under conditions without conflicts.

Figure 1:
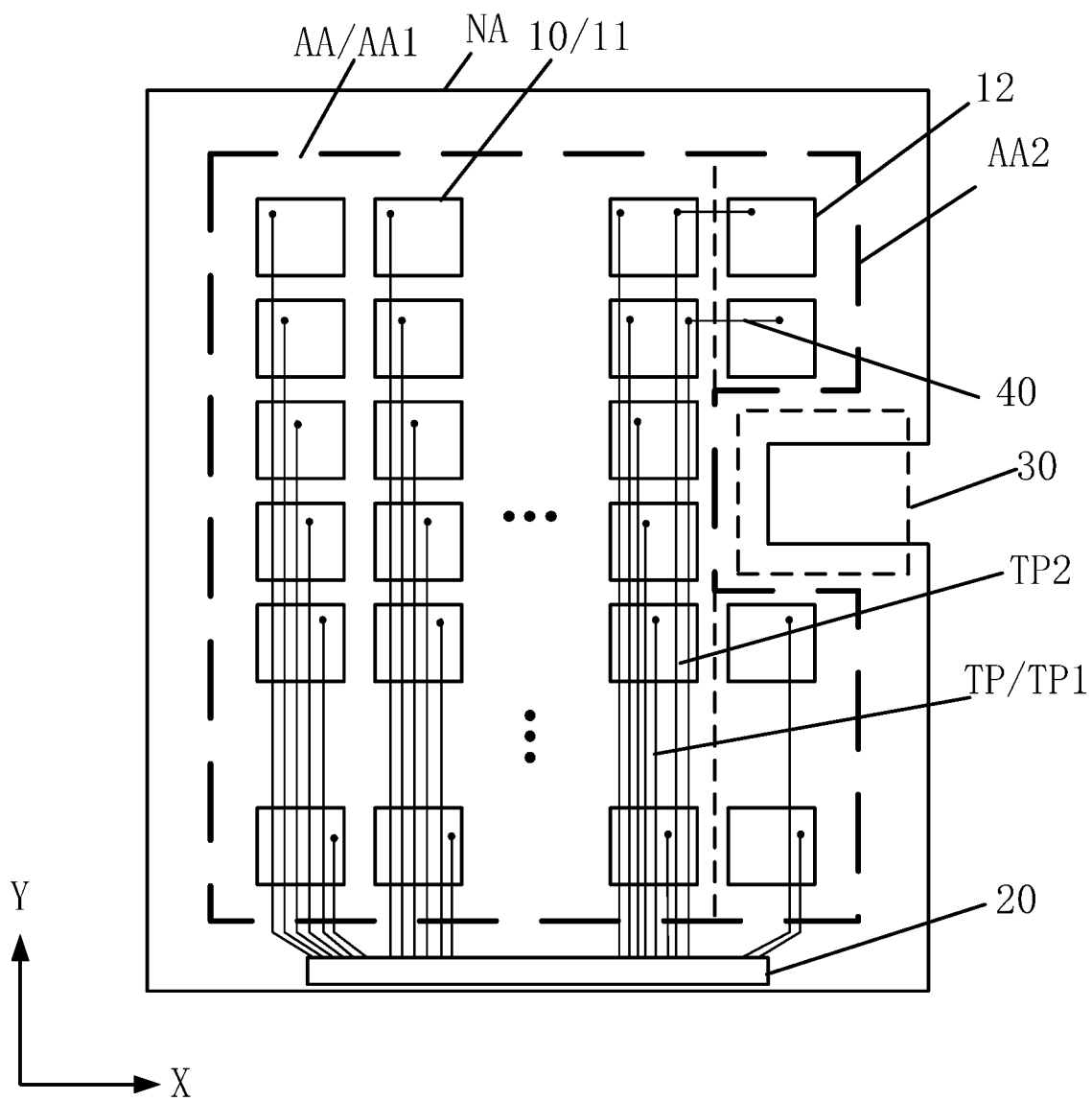
FIG. 1 illustrates a schematic top view of an exemplary display panel consistent with the disclosed embodiments.

The present disclosure provides a display panel. FIG. 1 illustrates a schematic top view of an exemplary display panel consistent with the disclosed embodiments. As shown in FIG. 1, the display panel may include a display area AA and a non-display area NA surrounding the display area AA. The display area AA may include a plurality of touch control signal lines TP and a plurality of touch control electrodes 10 arranged in an array. A touch control electrode 10 may be electrically connected to at least one touch control signal line TP. The touch control signal lines TP may extend along a first direction Y. The non-display area NA may include a driving circuit 20, and one end of the touch control signal lines TP may be electrically connected to the driving circuit 20.

The display area AA may include at least one notch 30, a first display area AA1 and a second display area AA2. The first display area AA1 and the notch 30 may be arranged along a second direction X. The notch 30 may have a first side far away from the driving circuit 20 and an opposing second side, and the second display area AA2 may be disposed at the first side of the notch 30. The second display area AA2 and the notch 30 may be arranged along the first direction Y. The first direction Y may intersect the second direction X.

The plurality of touch control electrodes 10 may include a plurality of first touch control electrodes 11 disposed at the first display area AA1 and a plurality of second touch control electrodes 12 disposed at the second display area AA2. The plurality of touch control signal lines TP may include a plurality of first touch control signal lines TP1 and a plurality of second touch control signal lines TP2 disposed at the first display area AA1. A first touch control electrode 11 may be electrically connected to at least one first touch control signal line TP1, and a second touch control electrode 12 may be electrically connected to at least one second touch control signal line TP2 via a connecting portion 40.

Further, the display area AA may have a display function, and the non-display area NA may be disposed with circuit components, wires, etc.

In the disclosed embodiments, the display panel may be an irregular-shaped display panel. In particular, the display panel may include at least one notch 30, so that the display area AA may no longer exit as a rectangle which is continuously extending. For illustrative purpose, FIG. 1 shows the display panel may include only one notch 30. In practical applications, the display panel may include two or more notches, which is not limited by the present disclosure. The notch 30 may be formed by recessing one edge of the display area AA toward the inside of the display area AA, or may be an opening disposed inside the display area AA, which is not limited by the present disclosure.

The display area AA may include the plurality of touch control signal lines TP extending along the first direction Y and the plurality of touch control electrodes 10 arranged in an array. The display area AA may include at least a 2×2 array of mutually insulated touch control electrodes 10. One touch control electrode 10 may be electrically connected to at least one touch control signal line TP. One end of the touch control signal line TP may be electrically connected to the driving circuit 20, through which the driving circuit 20 may send a touch control signal to the touch control electrode 10 through the touch control signal line TP. For example, when the touch control electrode 10 is approached or touched by an object, such as a finger, a coupling capacitor may be formed among the finger and the touch control electrode 10, and the formed coupling capacitor may cause a change in the capacitance of the touch control electrode 10 itself to the ground. By detecting the change of the capacitance, the one or more touch control electrodes 10 which the finger is approaching may be determined, according to which the touch position of the finger may be determined.

In the disclosed embodiments, the display area AA may include at least one notch 30. Meanwhile, the display area AA may at least include a first display area AA1 and a second display area AA2. The second display area AA2 may be disposed at the first side of the notch 30 (i.e., a side far away from the driving circuit 20), and the second display area AA2 and the notches 30 may be arranged in the first direction Y. Thus, the notch 30 may cause the touch control signal lines, which are connected to the driving circuit 20 and extending to the second display area AA2 to provide touch control signals to the second touch control electrodes 12 disposed at the second display area AA2, to be disconnected at the notch 30. Accordingly, the touch control signal provided by the driving circuit 20 may be unable to be transmitted to the second touch control electrode 12 through the disconnected touch control signal line, and the touch position of the second display area AA2 may not be detected.

In the disclosed embodiments, through configuring the second touch control signal line TP2, which is electrically connected to the second touch control electrode 12 disposed at the second display area AA2, to be disposed at the first display area AA1, and electrically connecting the second touch control electrode 12 disposed at the second display area AA2 to the second touch control signal line TP2 disposed at the first display area AA1 via the connecting portion 40, one end of the second touch control signal line TP2 may be electrically connected to the driving circuit 20. Thus, the driving circuit 20 may be able to provide the touch control signal to the second touch control electrode 12 disposed at the second display area AA2 through the second touch control signal line TP2, thereby detecting the touch position in the second display area AA2.

In one embodiment, in a display stage, the touch control electrode 10 may be multiplexed as a common electrode. In particular, when the touch control electrode 10 is multiplexed as a common electrode, an electric field effect may be generated between the common electrode and a pixel electrode (not drawn in FIG. 1) to drive the liquid crystal to be reoriented, thereby displaying images. In the display stage, the touch control electrode 10 may be multiplexed as the common electrode to receive a display signal, and in the touch control stage, the touch control electrode 10 may be configured to receive a touch control signal.

In one embodiment, the touch control electrode 10 may include a material of indium tin oxide (ITO), i.e., the touch control electrode 10 may be an ITO electrode, and the touch control signal line TP and the connecting portion 40 may include a metal material. In particular, the ITO is transparent when being a film, such that the display performance may not be affected. The metal material has good conductivity and ductility, such that the driving circuit 20 may transmit the touch control signal to the touch control electrode 10 via the touch control signal line TP and/or the connecting portion 40.

It should be noted that, the touch control electrode 10 may include a material of ITO, and the touch control signal line TP and the connecting portion 40 may include a metal material, which is for illustrative purposes and is not intended to limit the scope of the present disclosure. In another embodiment, the touch control electrode, the touch control signal line TP and/or the connecting portion 40 may include other materials, which is not limited by the present disclosure.

Figure 2:
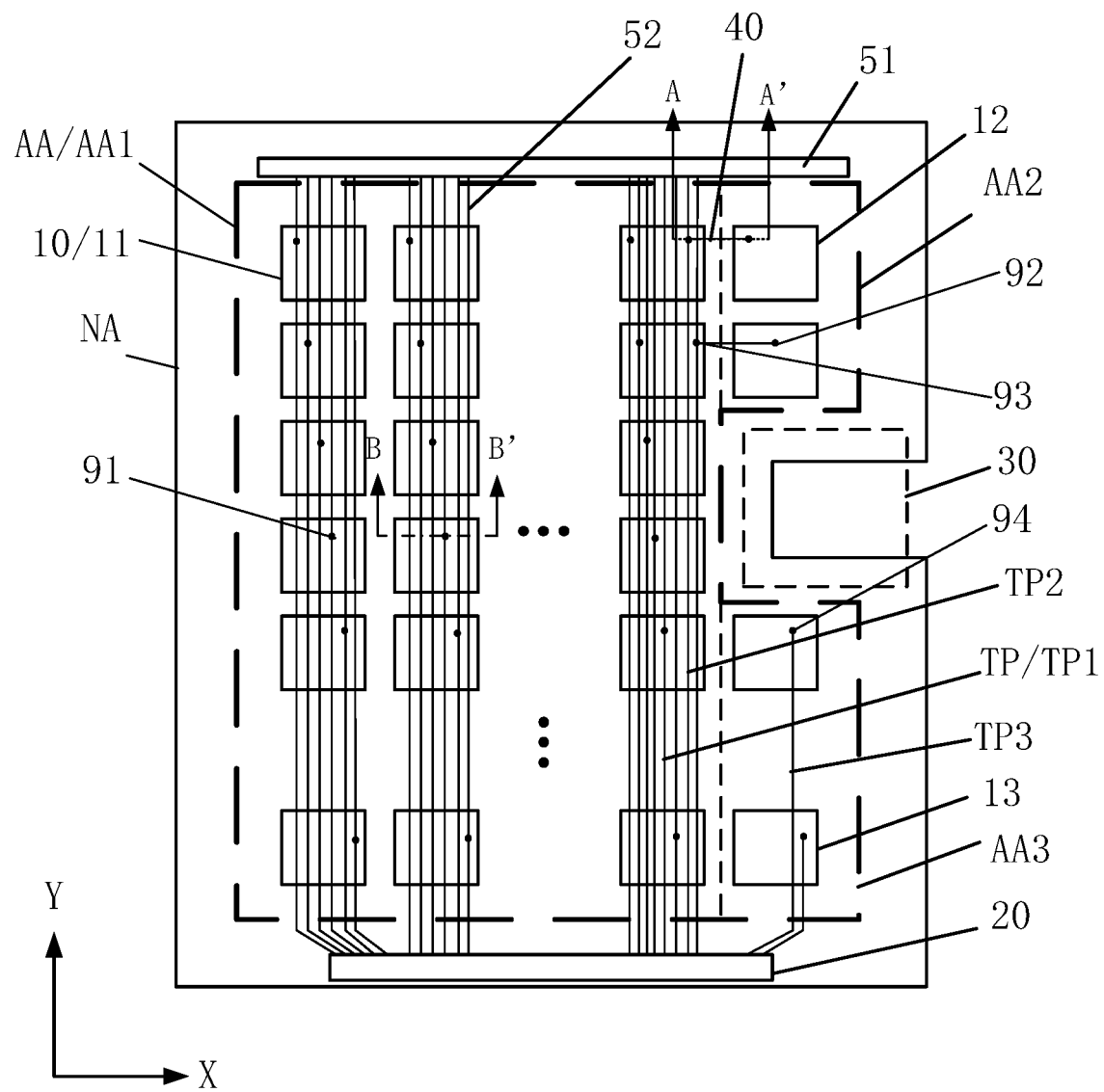
FIG. 2 illustrates a schematic top view of another exemplary display panel consistent with the disclosed embodiments.

FIG. 2 illustrates a schematic top view of another exemplary display panel consistent with the disclosed embodiments. The similarities between FIG. 1 and FIG. 2 are not repeated, while certain difference may be explained.

As shown in FIG. 2, the non-display area NA may further include a touch control electrostatic protection circuit 51. The display area AA has a first side far away from the driving circuit 20 and an opposing second side, and the touch control electrostatic protection circuit 51 may be disposed at the first side of the display area AA. Another end of the touch control signal line TP may be electrically connected to the touch control electrostatic protection circuit 51 through a touch control connecting line 52.

The non-display area NA may further include the touch control electrostatic protection circuit 51, and the touch control electrostatic protection circuit 51 may be disposed at the first side of the display area AA. That is, in the first direction Y, the touch control electrostatic protection circuit 51 and the driving circuit 20 may be oppositely disposed at two sides of the display area AA, instead of being disposed adjacent to each other at the same side of the display area AA. Thus, a region in the non-display area NA where the driving circuit 20 is dispose may be prevented from having an excessive size, and the space of the non-display area NA may be reasonably utilized, which may facilitate the narrow frame of the display panel.

The touch control signal line TP in the first display area AA1 may be electrically connected to the touch control electrostatic protection circuit 51 through the touch control connecting line 52. The touch control electrostatic protection circuit 51 may enable the touch control signal line TP disposed at the first display area AA1 to have an electrostatic protection capability, which may fully protect the touch control signal lines TP of the display panel from being abnormal because of the substantially large or small transmitted electrical signal.

In one embodiment, the touch control connecting line 52 and the touch control signal line TP may have the same material and disposed at the same layer. In another embodiment, the touch control connecting line 52 and the touch control signal line may have different materials and/or disposed at different layers, which is not limited by the present disclosure.

Figure 3A:
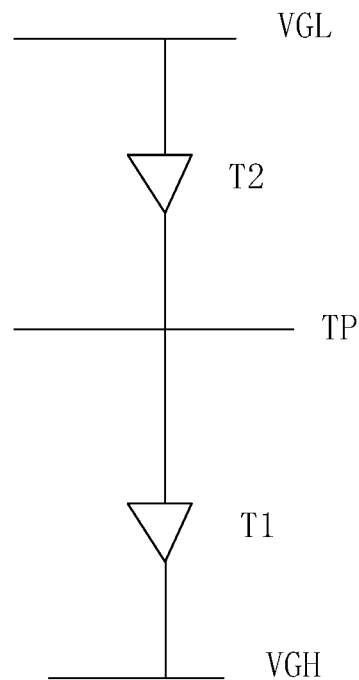
FIG. 3a illustrates an equivalent circuit diagram of an exemplary touch control electrostatic protection circuit consistent with the disclosed embodiments.

FIG. 3a illustrates an equivalent circuit diagram of an exemplary touch control electrostatic protection circuit consistent with the disclosed embodiments. As shown in FIG. 3a, the touch control electrostatic protection circuit may include a first transistor T1 and a second transistor T2, which may be both diodes. When positive electrostatic charges are generated and causes the voltage at the touch control signal line TP to be higher than the voltage at a first high-level input terminal VGH, the first transistor T1 may be forward-conducting. Thus, the electrostatic charges at the touch control signal line TP may be guided away, allowing the voltage at the touch control signal line TP to be maintained as the voltage of the first high-level input terminal VGH. When negative electrostatic charges are generated and causes the voltage at the touch control signal line TP to be lower than the voltage at a first low-level input terminal VGL, the second transistor T2 may be forward-conducting. Thus, the electrostatic charges at the touch control signal line TP may be guided away, allowing the voltage at the touch control signal line TP to be maintained as the voltage of the first low-level input terminal VGL. Thus, the electrostatic protection of the touch control signal line TP may be achieved.

Figure 3B:
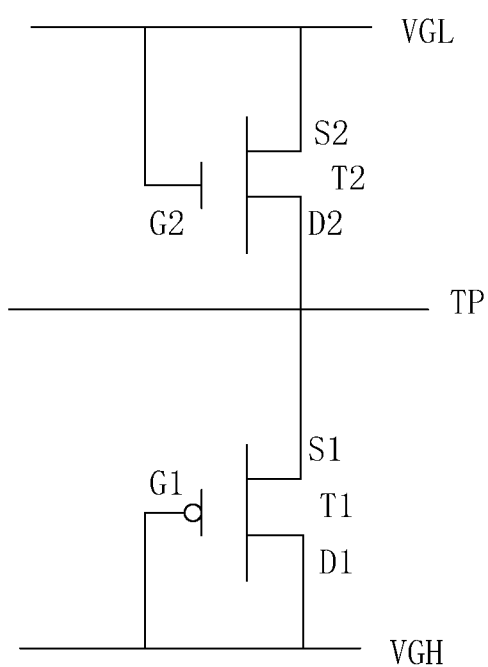
FIG. 3b illustrates an equivalent circuit diagram of another exemplary touch control electrostatic protection circuit consistent with the disclosed embodiments.

FIG. 3b illustrates an equivalent circuit diagram of another exemplary touch control electrostatic protection circuit consistent with the disclosed embodiments. The similarities between FIG. 3a and FIG. 3b are not repeated, while certain difference may be explained.

As shown in FIG. 3b, the first transistor T1 may have a source electrode S1 electrically connected to the touch control signal line TP, and a drain electrode D1 and a gate electrode G1 both electrically connected to the first high-level input terminal VGH. The second transistor T2 may have a drain electrode D2 electrically connected to the touch control signal line TP, and a source electrode S2 and a gate electrode G2 both electrically connected to the first low-level input terminal VGL. In one embodiment, as shown in FIG. 3b, the first transistor T1 may be a P-type transistor, and the first transistor T1 may have the source electrode S1 electrically connected to the touch control signal line TP, and the drain electrode D1 and the gate electrode G1 both electrically connected to the first high-level input terminal VGH. The second transistor T2 may be a N-type transistor, and the second transistor T2 may have the drain electrode D2 electrically connected to the touch control signal line TP, and the source electrode S2 and the gate electrode G2 both electrically connected to the first low-level input terminal VGL.

The P-type transistor may be turned on when the difference between the gate electrode voltage Vg and the source electrode voltage Vs (or the drain electrode voltage Vd) is smaller than the threshold voltage Vth. The N-type transistor may be turned on when the difference between the gate electrode voltage Vg and the source electrode voltage Vs (or the drain electrode voltage Vd) is greater than the threshold voltage Vth.

When the voltage at the touch control signal line TP is greater than the voltage at the first high-level input terminal VGH, the first transistor T1 may be turned on, and the source electrode S1 and drain electrode D1 of the first transistor T1 may be conducting. That is, the touch control signal line TP and the first high-level input terminal VGH may be conducting to maintain the voltage at the touch control signal line TP as the voltage at the first high-level input terminal VGH. When the voltage at the touch control signal line TP is smaller than the voltage at the first low-level input terminal VGL, the second transistor T2 may be turned on, and the source electrode S2 and drain electrode D2 of the second transistor T2 may be conducting. That is, the touch control signal line TP and the first low-level input terminal VGL may be conducting to maintain the voltage at the touch control signal line TP as the voltage at the first love-level input terminal VGL. When the voltage at the touch control signal line TP is between the voltage at the first low-level input terminal VGL and the voltage at the first high-level input terminal VGH, neither the first transistor T1 nor the second transistor T2 may be turned on.

It should be noted that, for illustrative purposes, the touch static protection circuit is described by taking the P-type first transistor T1 and the N-type second transistor T2 as an example. In another embodiment, the touch control signal line may be protected in other manners, i.e., the touch static protection circuit may have other structure, which is not limited by the present disclosure.

Figure 4:
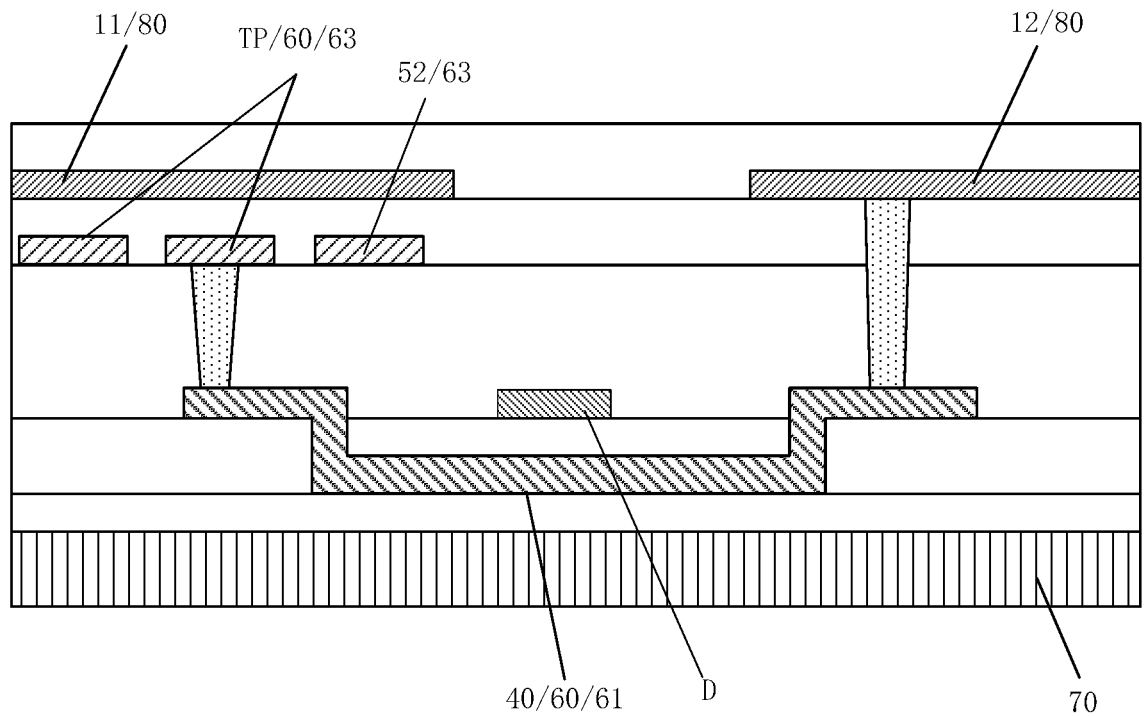
FIG. 4 illustrates an exemplary AA'-sectional view of the display panel in FIG. 2 consistent with the disclosed embodiments.

FIG. 4 illustrates an exemplary AA'-sectional view of the display panel in FIG. 2 consistent with the disclosed embodiments. As shown in FIG. 2 and FIG. 4, the display panel may include a plurality of metal layers 60, and the touch control signal line TP and the connecting portion 40 may be disposed at different metal layers 60. The touch control signal line TP and the touch control connecting line 52 may be disposed at the same layer. That is, the metal layer where the touch control signal line TP is disposed may also be disposed with the touch control connecting line 52.

When the touch control signal line TP and the connecting portion 40 are configured to be disposed at the same metal layer 60, the connecting portion 40 and the touch control connecting line 52 may also be disposed at the same metal layer 60, and the connecting portion 40 may be in contact with the touch control connecting lines 52 electrically connected to other touch control signal lines TP, which causes a short circuit between the connecting portion 40 and the touch control connecting line 52. In view of this, in the disclosed embodiments, through disposing the touch control signal line TP and the connecting portion 40 at different metal layers 60, i.e., disposing the touch connecting line 52 and the connecting portion 40 at different metal layers 60, the connecting portions 40 electrically connected to different touch control signal lines TP may be electrically insulated from the touch control connecting lines 52, such that a short circuit between the connecting portions 40 and the touch control connecting lines 52 may be avoided, and the touch control performance of the display panel may be ensured.

In another embodiment, the display panel may include a plurality of metal layers 60, the touch control signal line TP and the connecting portion 40 may be disposed at the same metal layer 60, and the connecting portion 40 may be disconnected at positions overlapping the other touch control signal lines TP, and then connected again via conductive structures disposed at a metal layer different from the other touch control signal lines TP, which is not limited by the present disclosure.

Figure 5:
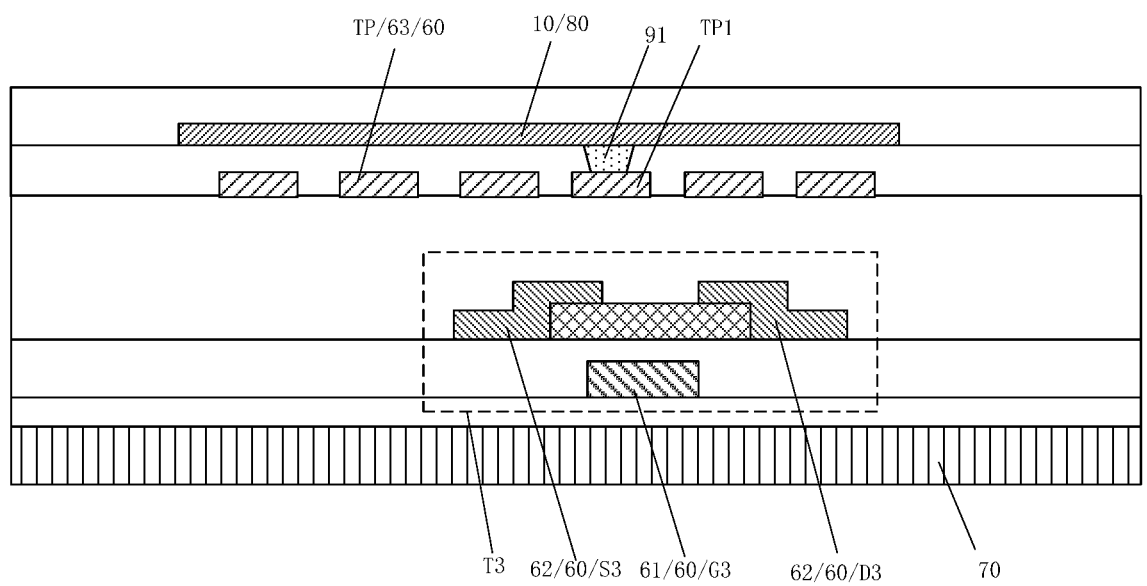
FIG. 5 illustrates an exemplary BB'-sectional view of the display panel in FIG. 2 consistent with the disclosed embodiments.

FIG. 5 illustrates an exemplary BB'-sectional view of the display panel in FIG. 2 consistent with the disclosed embodiments. As shown in FIG. 2 and FIGS. 4-5, the display panel may further include a base substrate 70 and a common electrode layer 80. The metal layers 60 may include a gate electrode metal layer 61, a source-drain electrode metal layer 62 including a source electrode metal layer and a drain electrode metal layer disposed at the same layer, and a touch control metal layer 63. The gate electrode metal layer 61 may be disposed at one side of the base substrate 70. The gate electrode metal layer 61 may have a first facing the base substrate 70 and an opposing second side, and the source-drain electrode metal layer 62 may be disposed at the second side of the gate electrode metal layer 61. The source-drain electrode metal layer 62 may have a first facing the base substrate 70 and an opposing second side, and the touch control metal layer 63 may be disposed at the second side of the source-drain electrode metal layer 62. The touch control metal layer 63 may have a first facing the base substrate 70 and an opposing second side, and the common electrode layer 80 may be disposed at the second side of the touch control metal layer 63. The touch control signal line TP may be disposed at the touch control metal layer 63, the touch control electrode 10 may be disposed at the common electrode layer 80, and the connecting portion 40 may be disposed at the gate electrode metal layer 61 and/or the source-drain electrode metal layer 62.

Referring to FIG. 2 and FIGS. 4-5, the display panel may include the base substrate 70, and the gate electrode metal layer 61, the source-drain electrode metal layer 62, the touch control metal layer 63 and the common electrode layer 80 may be sequentially disposed on the base substrate 70. The display panel may include a plurality of thin-film transistors (TFTs) T3 disposed at the display area AA. The thin-film transistor T3 may include a gate electrode G3 disposed at the gate electrode metal layer 61, a source electrode S3 and a drain electrode D3 both disposed at the source-drain electrode metal layer 62. The touch control electrode 10 may be disposed at the common electrode layer 80. The touch control signal line TP and the connecting portion 40 may be disposed at different metal layers 60, for example, the touch control signal line TP may be disposed at the touch control metal layer 63, and the connecting portion 40 may be disposed at the metal layer 60 other than the touch control metal layer 63. In one embodiment, the connecting portion 40 may be disposed at the gate electrode metal layer 61 and/or the source-drain electrode metal layer 62.

The source-drain electrode metal layer 62 may further include a plurality of data lines D. The data lines D and the touch control signal lines TP may extend in the same direction. The connecting portion 40 may be partially disposed at the source-drain electrode metal layer 62 and partially at the gate electrode metal layer 61, such that the connecting portion 40 may be electrically insulated from the data line D.

Figure 6:
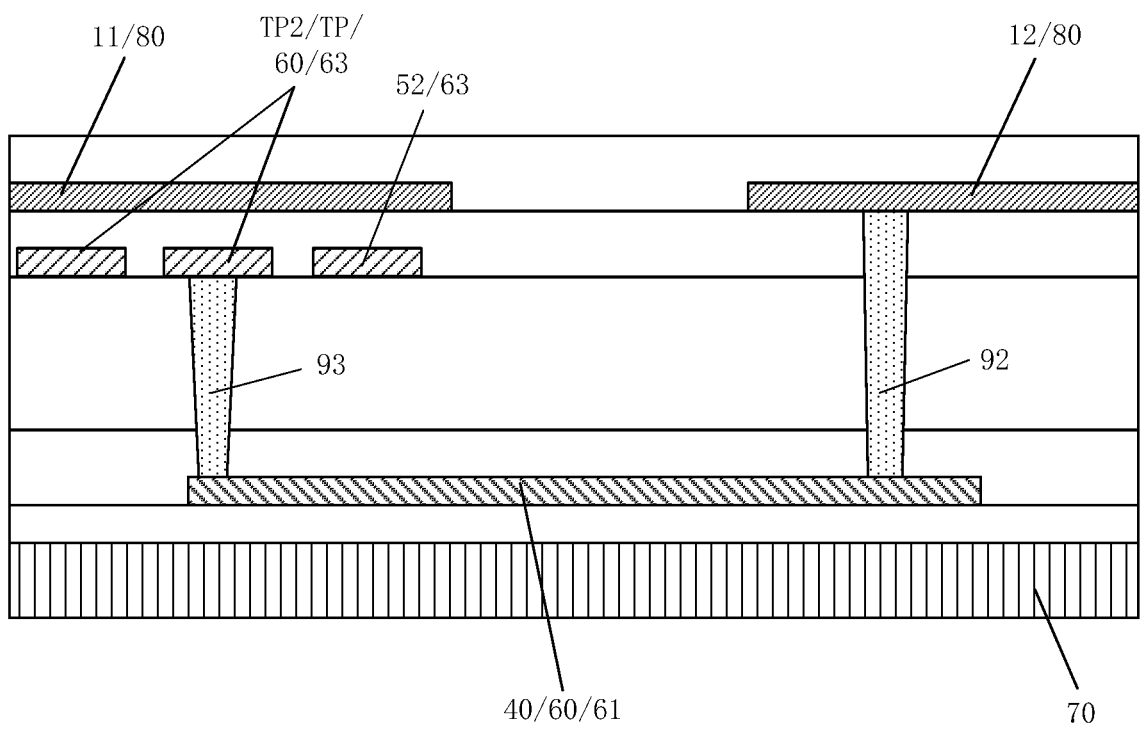
FIG. 6 illustrates another exemplary AA'-sectional view of the display panel in FIG. 2 consistent with the disclosed embodiments.

FIG. 6 illustrates another exemplary AA'-sectional view of the display panel in FIG. 2 consistent with the disclosed embodiments. As shown in FIG. 2 and FIG. 6, the connecting portion 40 may be disposed at the gate electrode metal layer 51. The touch control signal line TP may be disposed at the touch control metal layer 63, and the connecting portion 40 may be disposed at the gate electrode metal layer 51, such that the connecting portion 40 may be prevented from being in contact with the signal lines disposed at the source-drain electrode metal layer 62 and touch control metal layer 63. The driving circuit 20 may provide the touch control signals to the second touch control electrode 12 disposed at the second display area AA2 through the second touch control signal line TP2 and the connecting portion 40.

Referring to FIG. 2, FIG. 5 and FIG. 6, the first touch control signal line TP1 may be electrically connected to the corresponding first touch control electrode 11 by a first through-hole 91. The connecting portion 40 may be electrically connected to the second touch control electrode 12 by a second through-hole 92, and the connecting portion 40 may be electrically connected to the second touch control signal line TP2 by a third through-hole 93.

Through configuring the first touch control signal line TP1 to be electrically connected to the corresponding first touch control electrode 11 by the first through-hole 91, the driving circuit 20 may provide the touch control signal to the first touch control electrode 11 through the corresponding first touch control signal line TP1. Through configuring the connecting portion 40 to be electrically connected to the second touch control electrode 12 by the second through-hole 92, and configuring the connecting portion 40 to be electrically connected to the second touch control signal line TP2 by the third through-hole 93, the driving circuit 20 may provide the touch control signal to the second touch control electrode 12 through the second touch control signal line TP2 and the connecting portion 40.

Referring to FIG. 2, the display area AA may further include a third display area AA3. The notch 30 may have the first side far away from the driving circuit 20 and the opposing second side, and the third display area AA3 may be disposed at the second side of the notch 30. The third display area AA3 and the notch 30 may be arranged in the first direction Y. In the first direction Y, the third display area AA3 and the second display area AA2 may be disposed at opposite sides of the notch 30.

Further, the touch control electrodes 10 may further include a plurality of third touch control electrodes 13 disposed at the third display area AA3, and the touch control signal lines TP may further include a plurality of third touch control signal lines TP3 disposed at the third display area AA3. A third touch control electrode 13 may be electrically connected to at least one third touch control signal line TP3, and the third touch control signal line TP3 may be electrically connected to the corresponding third touch control electrode 13 by a fourth through-hole 94.

The third touch control signal line TP3 may have one end electrically connected to the corresponding third touch control electrode 13 by the fourth through-hole 94, and another end electrically connected to the driving circuit 20. Thus, the driving circuit 20 may provide the touch control signal to the third touch control electrode 13 in the third display area AA3 through the third touch control signal line TP3, thereby detecting a touch position in the third display area AA3.

Figure 7:
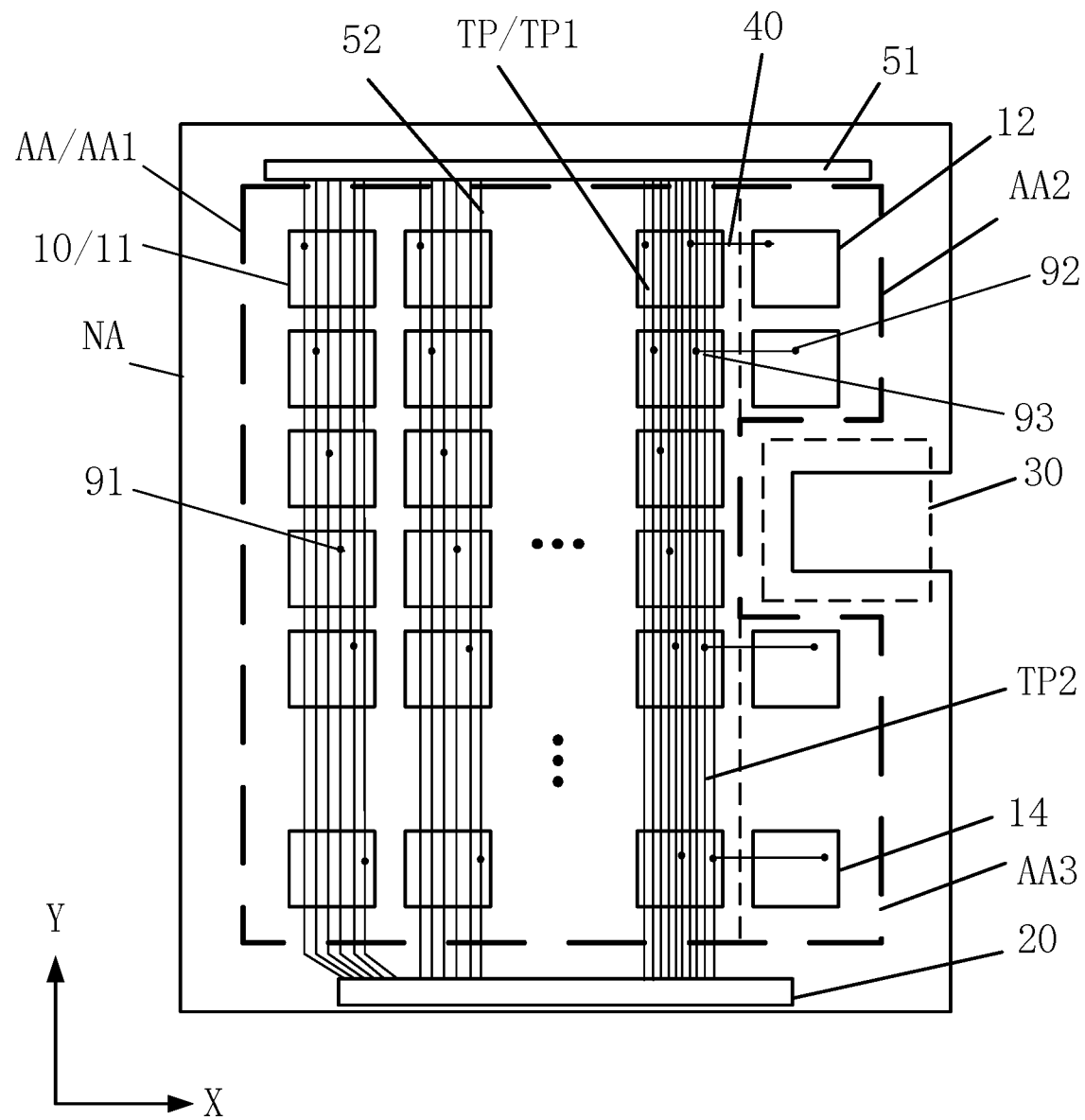
FIG. 7 illustrates a schematic top view of another exemplary display panel consistent with the disclosed embodiments.

FIG. 7 illustrates a schematic top view of another exemplary display panel consistent with the disclosed embodiments. The similarities between FIG. 7 and FIG. 2 are not repeated, while certain difference may be explained.

As shown in FIG. 7, the touch control electrodes 10 may further include a plurality of fourth touch control electrodes 14 disposed at the third display area AA3. A fourth touch control electrode 14 may be electrically connected to at least one second touch control signal line TP2 through the connecting portion 40. The second touch control signal line TP2 may be disposed at the first display area AA1. In the first direction Y, the third display area AA3 and the second display area AA2 may be disposed at opposite sides of the notch 30. The connecting portion 40 may be electrically connected to the fourth touch control electrode 14 by the second through-hole 92, and electrically connected to the second touch control signal line TP2 by the third through-hole 93, such that the driving circuit 20 may provide the touch control signal to the fourth touch control electrode 14 through the second touch control signal line TP2 and the connecting portion 40, thereby detecting a touch position in the third display area AA3.

In the disclosed embodiments, the touch control signal may be provided to both the second touch control electrode 12 disposed at the second display area AA2 and the fourth touch control electrode 14 disposed at the third display area AA3 through the second touch control signal line TP2 disposed at the first display area AA1. The touch control signal line TP in the first display area AA1 may be electrically connected to the touch control electrostatic protection circuit 51 through the touch control connecting line 52. The touch control electrostatic protection circuit 51 may enable the second touch control signal line TP2 disposed at the first display area AA1 to have an electrostatic protection capability, which may protect the touch control signal lines TP electrically connected to the fourth touch control electrodes 14 from being abnormal because of the substantially large or small transmitted electrical signal. Accordingly, the touch control signal lines TP, which are electrically connected to the touch control electrodes 10 disposed at the display area AA, may be further fully protected from being abnormal because of the substantially large or small transmitted electrical signal.

Figure 8:
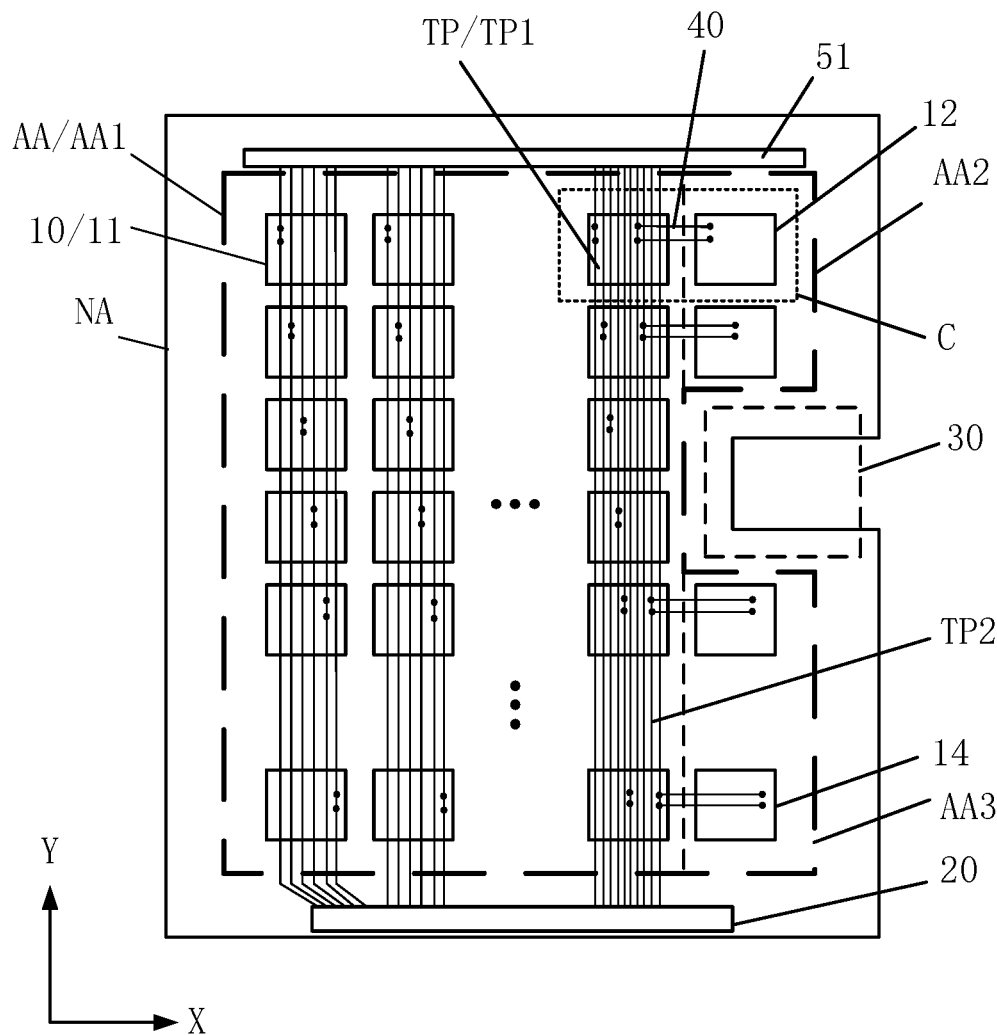
FIG. 8 illustrates a schematic top view of another exemplary display panel consistent with the disclosed embodiments.
Figure 9:
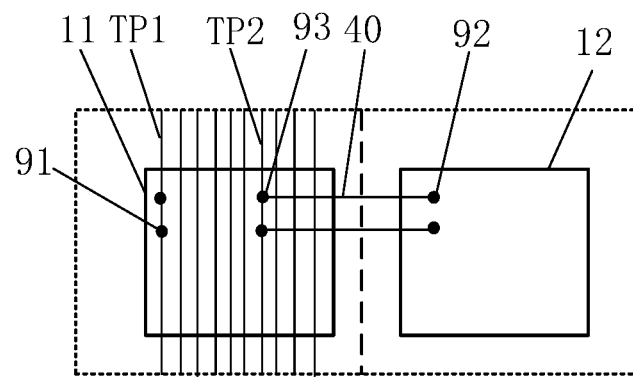
FIG. 9 illustrates an enlarged view of a portion C in FIG. 8.

FIG. 8 illustrates a schematic top view of another exemplary display panel consistent with the disclosed embodiments, and FIG. 9 illustrates an enlarged view of a portion C in FIG. 8. As shown in FIG. 8 and FIG. 9, one first touch control signal line TP1 may be electrically connected to the first touch control electrode 11 through at least two first through-hole holes 91, and one second touch control signal line TP2 may be electrically connected to the second touch control electrode 12 through at least two connecting portions 40.

Through configuring the first touch control signal line TP1 to be electrically connected to the first touch control electrode 11 through at least two first through-hole holes 91, the electrical connection between the first touch control signal line TP1 and the first touch control electrode 11 may be effectively improved, and poor electrical connection caused by the process may be prevented. Through configuring the second touch control signal line TP2 to be electrically connected to the second touch control electrode 12 through at least two connecting portions 40, the electrical connection between the second touch control signal line TP2 and the second touch control electrode 12 may be effectively improved, and poor electrical connection caused by the process may be prevented.

FIGS. 8-9 show that one first touch control signal line TP1 may be electrically connected to the first touch control electrode 11 through two first through-hole holes 91, and one second touch control signal line TP2 may be electrically connected to the second touch control electrode 12 through two connecting portions 40, which is for illustrative purposes and is not intended to limit the scope of the present disclosure. In another embodiment, one first touch control signal line TP1 may be electrically connected to the first touch control electrode 11 through more than two first through-hole holes 91, and/or one second touch control signal line TP2 may be electrically connected to the second touch control electrode 12 through more than two connecting portions 4, which is not limited by the present disclosure.

In one embodiment, one second touch control signal line TP2 may be electrically connected to the fourth touch control electrode 14 through at least two connecting portions 40, such that the electrical connection between the second touch control signal line TP2 and the fourth touch control electrode 14 may be effectively improved, and poor electrical connection caused by the process may be prevented.

Figure 10:
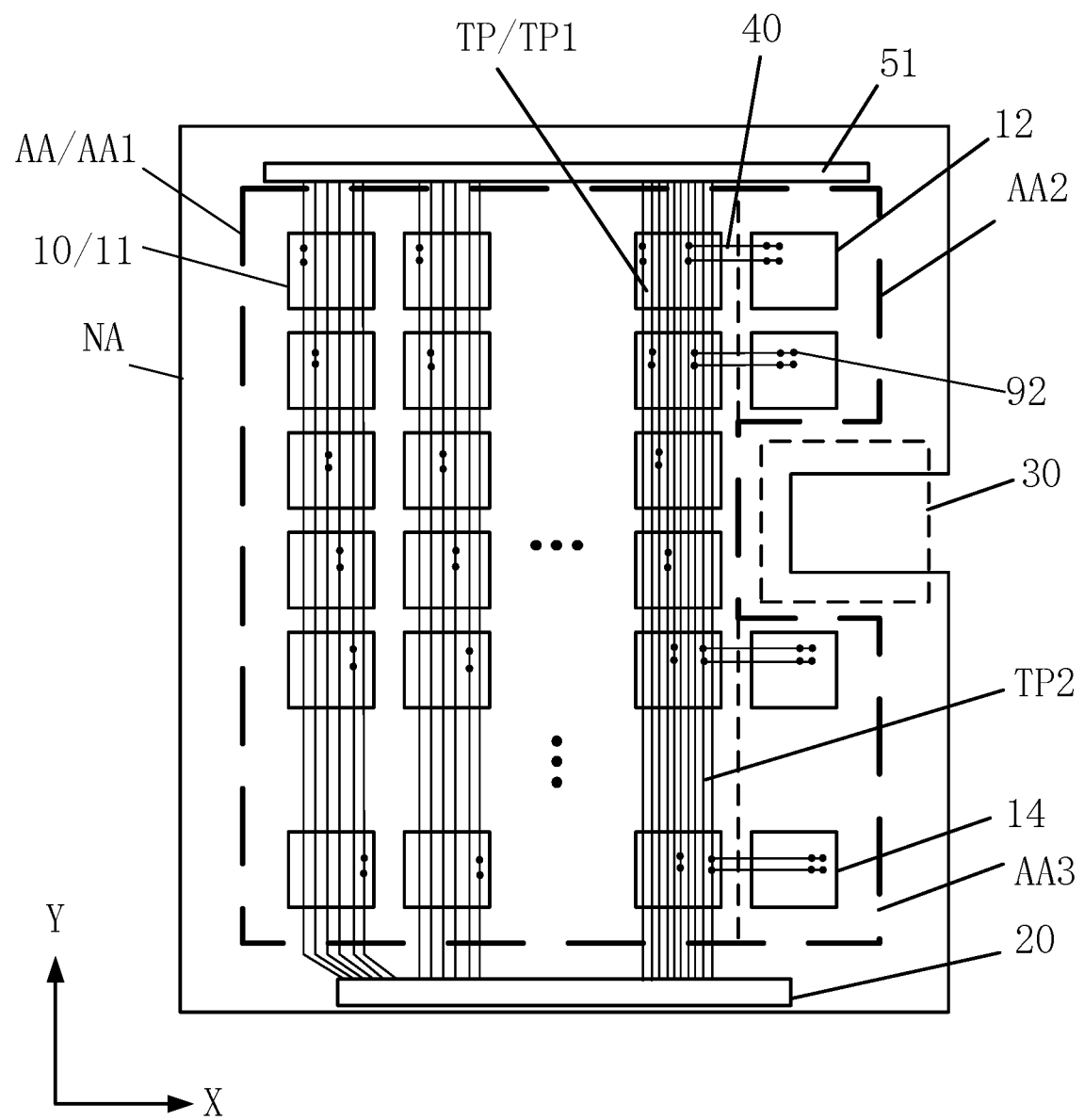
FIG. 10 illustrates a schematic top view of another exemplary display panel consistent with the disclosed embodiments.

FIG. 10 illustrates a schematic top view of another exemplary display panel consistent with the disclosed embodiments. As shown in FIG. 10, one connecting portion 40 may be electrically connected to the second touch control electrode 12 through at least two second through-hole holes 92. Thus, the electrical connection between the second touch control electrode 12 and the connecting portion 40 may be effectively improved, and poor electrical connection caused by the process may be prevented.

FIG. 10 shows one connecting portion 40 may be electrically connected to the second touch control electrode 12 through two second through-hole holes 92, which is for illustrative purposes and is not intended to limit the scope of the present disclosure. In another embodiment, one connecting portion 40 may be electrically connected to the second touch control electrode 12 through more than two second through-hole holes 92, which is not limited by the present disclosure.

In one embodiment, one connecting portion 40 may be electrically connected to the fourth touch control electrode 14 through at least two second through-hole holes 92, such that the electrical connection between the fourth touch control electrode 14 and the connecting portion 40 may be effectively improved, and poor electrical connection caused by the process may be prevented.

Figure 11:
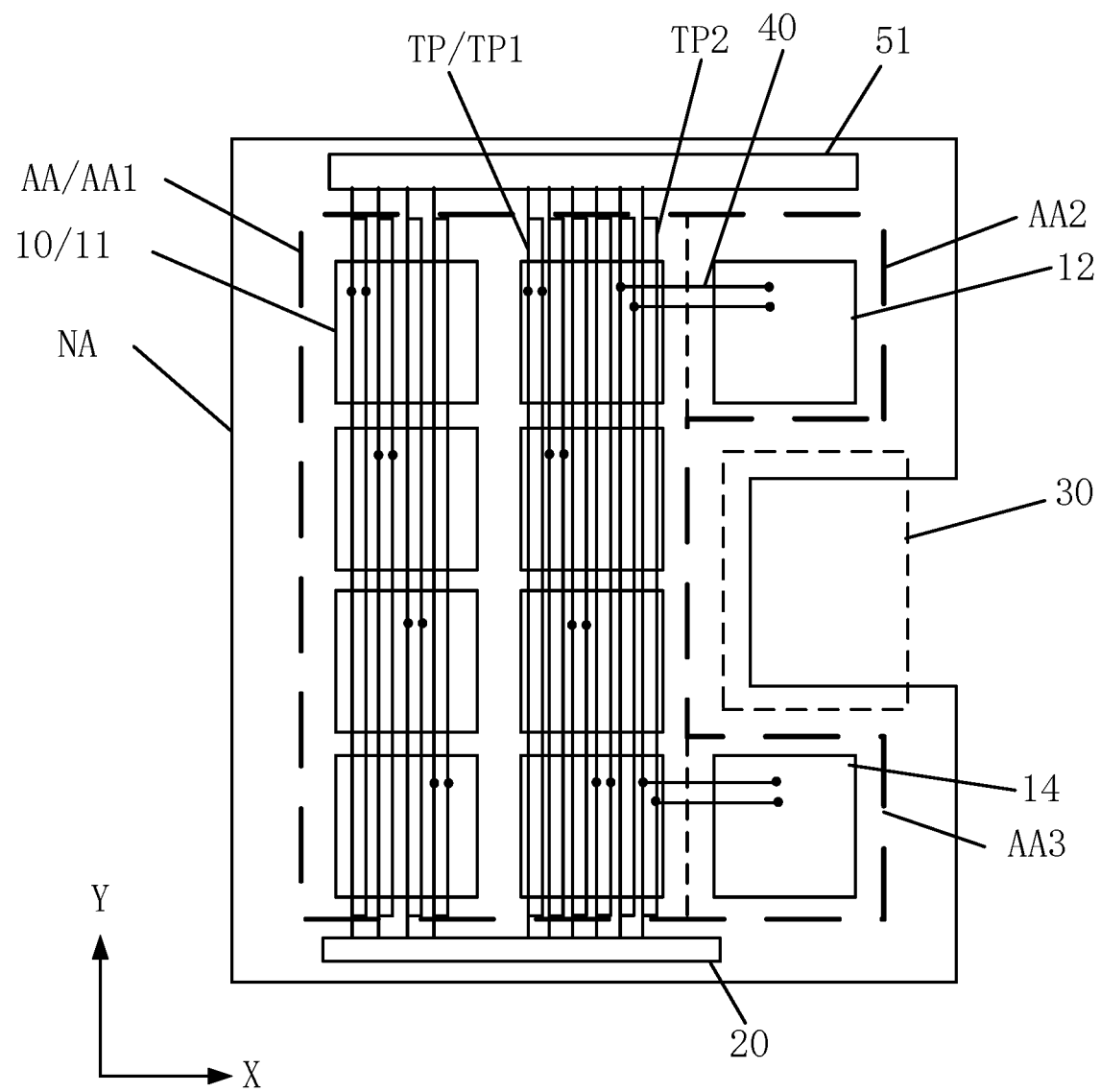
FIG. 11 illustrates a schematic top view of another exemplary display panel consistent with the disclosed embodiments.

FIG. 11 illustrates a schematic top view of another exemplary display panel consistent with the disclosed embodiments. As shown in FIG. 11, one first touch control electrode 11 may be electrically connected to at least two first touch control signal lines TP1, and one second touch control electrode 12 may be electrically connected to at least two second touch control signal lines TP2 through the connecting portions 40.

Through configuring the first touch control electrode 11 to be electrically connected to least two first touch control signal lines TP1, and configuring the first touch control lines TP1 electrically connected to the same first touch control electrode 11 to be electrically connected in parallel, the resistance of the first touch control signal lines TP1 electrically connected to the same first touch control electrode 11 may be effectively reduced, and the attenuation of the input signal may be reduced, accordingly. In addition, when a first touch control signal line TP1 is damaged and cannot transmit the touch control signal to the first touch control electrode 11, other first touch control signal lines TP1 electrically connected to the same first touch control electrode 11 may transmit the touch control signal to the first touch control electrode 11, thereby effectively reducing the influence of the damaged first touch control line TP1 on the touch performance of the first display area AA1.

Meanwhile, through configuring the second touch control electrode 12 to be electrically connected to at least two second touch control signal lines TP2 through the connecting portions 40, and configuring the second touch control lines TP2 electrically connected to the same second touch control electrode 12 to be electrically connected in parallel, the resistance of the second touch control signal lines TP2 electrically connected to the same second touch control electrode 12 may be effectively reduced, and the attenuation of the input signal may be reduced, accordingly. In addition, when a second touch control signal line TP2 is damaged and unable to transmit the touch control signal to the second touch control electrode 12, other second touch control signal lines TP2 electrically connected to the same second touch control electrode 12 may transmit the touch control signal to the second touch control electrode 12, thereby effectively reducing the influence of the damaged second touch control line TP2 on the touch performance of the second display area AA2.

FIG. 11 shows one first touch control electrode 11 may be electrically connected to two first touch control signal lines TP1, and one second touch control electrode 12 may be electrically connected to two second touch control signal lines TP2 through the connecting portions 40, which is for illustrative purposes and is not intended to limit the scope of the present disclosure. In another embodiment, one first touch control electrode 11 may be electrically connected to more than two first touch control signal lines TP1, and/or one second touch control electrode 12 may be electrically connected to more than two second touch control signal lines TP2 through the connecting portions 40, which is not limited by the present disclosure.

In one embodiment, one fourth touch control electrode 14 may be electrically connected to least two second touch control signal lines TP2, and the second touch control signal lines TP2 electrically connected to the same fourth touch control electrode 14 may be electrically connected in parallel. Thus, the resistance of the second touch control signal lines TP2 electrically connected to the same fourth touch control electrode 14 may be effectively reduced, and the attenuation of the input signal may be reduced, accordingly.

Figure 12:
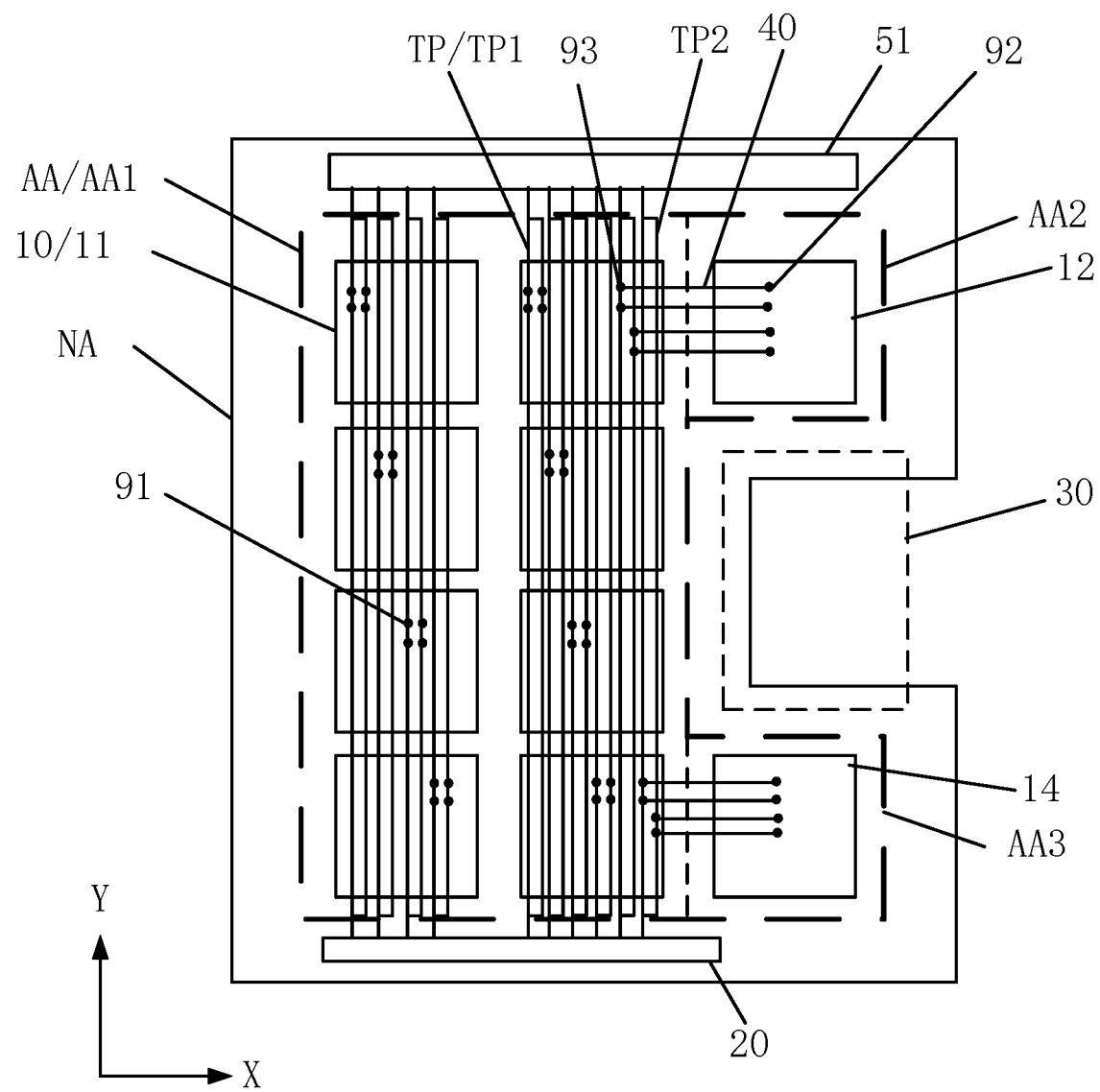
FIG. 12 illustrates a schematic top view of another exemplary display panel consistent with the disclosed embodiments.

FIG. 12 illustrates a schematic top view of another exemplary display panel consistent with the disclosed embodiments. As shown in FIG. 12, one first touch control electrode 11 may be electrically connected to at least two first touch control signal lines TP1, such that the resistance of the first touch control signal lines TP1 electrically connected to the same first touch control electrode 11 may be effectively reduced, and the attenuation of the input signal may be reduced, accordingly. Meanwhile, one first touch control electrode 11 may be electrically connected to one of the at least two first touch control signal lines TP1 through at least two first through-holes 91, thereby effectively enhancing the connection between the first touch control electrode 11 and the first touch control signal line TP1.

The second touch control electrode 12 may be electrically connected to at least two second touch control signal lines TP2 through the connecting portions 40, which may effectively reduce the resistance of the second touch control signal lines TP2 electrically connected to the same second touch control electrode 12, and reduce the attenuation of the input signal accordingly. Meanwhile, one second touch control electrode 12 may be electrically connected to one of the at least two second touch control signal lines TP2 through at least two connecting portions 40, thereby effectively enhancing the connection between the second touch control electrode 12 and the second touch control signal line TP2.

The fourth touch control electrode 14 may be electrically connected to at least two second touch control signal lines TP2 through the connecting portions 40, which may effectively reduce the resistance of the second touch control signal lines TP2 electrically connected to the same fourth touch control electrode 14, and reduce the attenuation of the input signal accordingly. Meanwhile, one fourth touch control electrode 14 may be electrically connected to one of the at least two second touch control signal lines TP2 through at least two connecting portions 40, thereby effectively enhancing the connection between the fourth touch control electrode 14 and the second touch control signal line TP2.

The present disclosure further provides a display device, including any one of the disclosed display panels.

Figure 13:
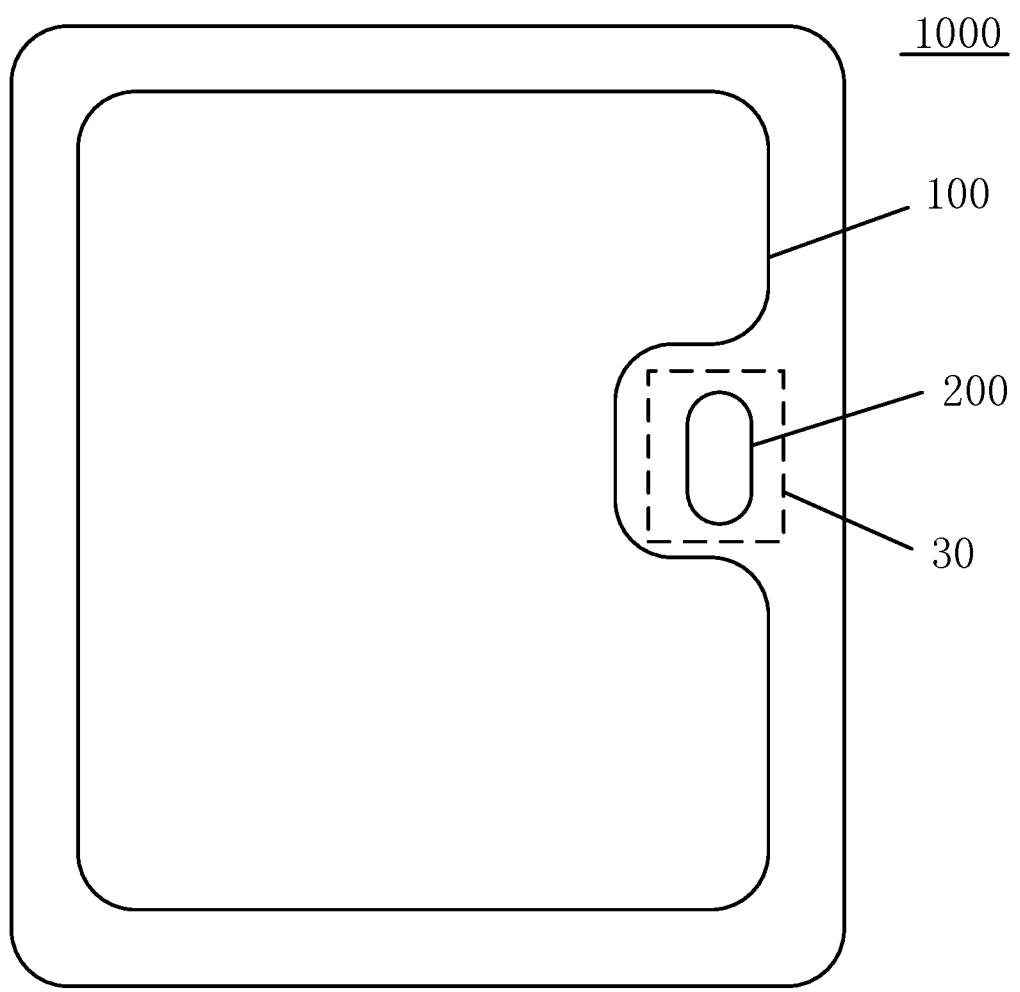
FIG. 13 illustrates an exemplary display device consistent with the disclosed embodiments.

FIG. 13 illustrates an exemplary display device 1000 consistent with the disclosed embodiments. As shown in FIG. 13, the display device 1000 may include a display panel 10 which is any one of the disclosed display panels. FIG. 13 shows the display device 1000 may be a mobile phone, which is for illustrative purposes and is not intended to limit the scope of the present disclosure. The display device 1000 may also be any display device with a display function such as a laptop, a television, a tablet, and a wearable device, etc., which may be not limited by the present discourse. Because the disclosed display device may include any one of the disclosed display panels, the disclosed display device may also have the same features as the disclosed display panel, and details are not described herein again.

The display device 1000 may further include an imaging component 200 disposed at the notch 30. Through disposing the imaging component 200 at the notch 30, the imaging component 200 and the display panel 100 may be highly integrated in the display device.

In the disclosed embodiments, through configuring the second touch control signal line, which is electrically connected to the second touch control electrode disposed at the second display area, to be disposed at the first display area, and electrically connecting the second touch control electrode disposed at the second display area to the second touch control signal line disposed at the first display area via the connecting portion, one end of the second touch control signal line may be electrically connected to the driving circuit. Thus, the driving circuit may be able to provide the touch control signal to the second touch control electrode disposed at the second display area through the second touch control signal line, thereby detecting the touch position in the second display area.

Various embodiments have been described to illustrate the operation principles and exemplary implementations. It should be understood by those skilled in the art that the present disclosure may be not limited to the specific embodiments described herein and that various other obvious changes, rearrangements, and substitutions will occur to those skilled in the art without departing from the scope of the disclosure. Thus, while the present disclosure may have been described in detail with reference to the above described embodiments, the present disclosure may be not limited to the above described embodiments, but may be embodied in other equivalent forms without departing from the scope of the present disclosure, which may be determined by the appended claims.

What may be claimed is:

1. A display panel, comprising:
a display area including a plurality of touch control signal lines extending along a first direction and a plurality of touch control electrodes arranged in an array, wherein a touch control electrode of the plurality of touch control electrodes is electrically connected to at least one of the plurality of touch control signal lines; and
a non-display area surrounding the display area and including a driving circuit electrically connected to one end of a touch control signal line of the plurality of touch control signal lines,
wherein the display area includes at least one notch, a first display area and a second display area,
the first display area and the at least one notch are arranged along a second direction intersecting the first direction,
the at least one notch has a first side far away from the driving circuit and an opposing second side, and the second display area is disposed at the first side of the at least one notch,
the second display area and the at least one notch are arranged along the first direction,
the plurality of touch control electrodes include a plurality of first touch control electrodes disposed at the first display area and a plurality of second touch control electrodes disposed at the second display area,
the plurality of touch control signal lines include a plurality of first touch control signal lines and a plurality of second touch control signal lines, both the plurality of first touch control signal lines and the plurality of second touch control signal lines being disposed at the first display area, and
a first touch control electrode of the plurality of first touch control electrodes is electrically connected to at least one of the plurality of first touch control signal lines, and a second touch control electrode is electrically connected to at least one of the plurality of second touch control signal lines at the first display area via a connecting portion, wherein the connection portion spans across the first display area and the second display area in the second direction.

2. The display panel according to claim 1, further comprising:
a plurality of metal layers, wherein the plurality of touch control signal line and the connecting portion are disposed at different metal layers.

3. The display panel according to claim 1, wherein:
the non-display area includes a touch control electrostatic protection circuit,
wherein the display area has a first side far away from the driving circuit and an opposing second side, and the touch control electrostatic protection circuit is disposed at the first side of the display area, and
the touch control signal line of the plurality of touch control signal lines has another end electrically connected to the touch control electrostatic protection circuit through a touch control connecting line.

4. The display panel according to claim 3, wherein:
the touch control electrostatic protection circuit includes a first transistor and a second transistor,
wherein the first transistor has a source electrode electrically connected to the touch control signal line of the plurality of touch control signal lines, and a drain electrode and a gate electrode both electrically connected to a first high-level input terminal, and
the second transistor has a drain electrode electrically connected to the touch control signal line of the plurality of touch control signal lines, and a source electrode and a gate electrode both electrically connected to a first low-level input terminal.

5. The display panel according to claim 1, wherein:
the first touch control electrode of the plurality of first touch control electrodes is electrically connected to at least two of the plurality of first touch control signal lines, and the second touch control electrode is electrically connected to at least two of the plurality of second touch control signal lines via connecting portions.

6. The display panel according to claim 1, wherein:
in a display stage, the plurality of touch control electrodes are multiplexed as a common electrode.

7. The display panel according to claim 1, wherein:
the plurality of touch control electrodes include a material of indium tin oxide (ITO), and
the plurality of touch control signal lines and the connecting portion include a material of metal.

8. A display panel, comprising:
a display area including a plurality of touch control signal lines extending along a first direction and a plurality of touch control electrodes arranged in an array, wherein a touch control electrode of the plurality of touch control electrodes is electrically connected to at least one of the plurality of touch control signal lines; and
a non-display area surrounding the display area and including a driving circuit electrically connected to one end of a touch control signal line of the plurality of touch control signal lines, wherein:
the display area includes at least one notch, a first display area and a second display area,
the first display area and the at least one notch are arranged along a second direction intersecting the first direction,
the at least one notch has a first side far away from the driving circuit and an opposing second side, and the second display area is disposed at the first side of the at least one notch,
the second display area and the at least one notch are arranged along the first direction,
the plurality of touch control electrodes include a plurality of first touch control electrodes disposed at the first display area and a plurality of second touch control electrodes disposed at the second display area,
the plurality of touch control signal lines include a plurality of first touch control signal lines and a plurality of second touch control signal lines disposed at the first display area, and
a first touch control electrode of the plurality of first touch control electrodes is electrically connected to at least one of the plurality of first touch control signal lines, and a second touch control electrode is electrically connected to at least one of the plurality of second touch control signal lines via a connecting portion,
a plurality of metal layers, wherein the plurality of touch control signal line and the connecting portion are disposed at different metal layers,
a base substrate and a common electrode layer,
wherein:
the plurality of metal layers include a gate electrode metal layer, a source-drain electrode metal layer, and a touch control metal layer,
the gate electrode metal layer is disposed at one side of the base substrate, the gate electrode metal layer has a first side facing the base substrate and an opposing second side, the source-drain electrode metal layer is disposed at the second side of the gate electrode metal layer, the source-drain electrode metal layer has a first side facing the base substrate and an opposing second side, the touch control metal layer is disposed at the second side of the source-drain electrode metal layer, the touch control metal layer has a first side facing the base substrate and an opposing second side, and the common electrode layer is disposed at the second side of the touch control metal layer, and
the plurality of touch control signal lines are disposed at the touch control metal layer, the plurality of touch control electrodes are disposed at the common electrode layer, and the connecting portion is disposed at least one of the gate electrode metal layer and the source-drain electrode metal layer.

9. The display panel according to claim 8, wherein:
the connecting portion is disposed at the gate electrode metal layer.

10. The display panel according to claim 9, wherein:
the first touch control electrode of the plurality of first touch control electrodes is electrically connected to the at least one of the plurality of first touch control signal lines by a first through-hole;
the second touch control electrode is electrically connected to the connecting portion by a second through-hole; and
the connecting portion is electrically connected to the at least one of the plurality of second touch control signal lines by a third through-hole.

11. The display panel according to claim 10, wherein:
the display area further includes a third display area disposed at the second side of the at least one notch, wherein the third display area and the at least one notch are arranged in the first direction.

12. The display panel according to claim 11, wherein:
the plurality of touch control electrodes further include a plurality of third touch control electrodes disposed at the third display area;
the plurality of touch control signal lines further include a plurality of third touch control signal lines disposed at the third display area; and
a third touch control electrode of the plurality of third touch control electrodes is electrically connected to at least one of the plurality of third touch control signal lines by a fourth through-hole.

13. The display panel according to claim 11, wherein:
the plurality of touch control electrodes further include a plurality of fourth touch control electrodes disposed at the third display area; and
a fourth touch control electrode of the plurality of fourth touch control electrodes is electrically connected to the at least one of the plurality of second touch control signal lines via the connecting portion.

14. The display panel according to claim 10, wherein:
the first touch control electrode of the plurality of first touch control electrodes is electrically connected to the at least one of the plurality of first touch control signal lines by at least two first through-holes; and
the second touch control electrode is electrically connected to the at least one of the plurality of second touch control signal lines by at least two connecting portions.

15. The display panel according to claim 14, wherein:
the connecting portion is electrically connected to the second touch control electrode by at least two second through-holes.

16. A display device, comprising:
a display panel, wherein the display panel comprises:
a display area including a plurality of touch control signal lines and a plurality of touch control electrodes arranged in an array, wherein a touch control electrode of the plurality of touch control electrodes is electrically connected to at least one of the plurality of touch control signal lines, and the plurality of touch control signal lines extend along a first direction; and a non-display area surrounding the display area, wherein the non-display area includes a driving circuit, and a touch control signal line of the plurality of touch control signal lines has one end electrically connected to the driving circuit, wherein the display area includes at least one notch, a first display area and a second display area, the first display area and the at least one notch are arranged along a second direction intersecting the first direction, the at least one notch has a first side far away from the driving circuit and an opposing second side, and the second display area is disposed at the first side of the at least one notch, the second display area and the at least one notch are arranged along the first direction, the plurality of touch control electrodes include a plurality of first touch control electrodes disposed at the first display area and a plurality of second touch control electrodes disposed at the second display area, the plurality of touch control signal lines include a plurality of first touch control signal lines and a plurality of second touch control signal lines, both the plurality of first touch control signal lines and the plurality of second touch control signal lines being disposed at the first display area, and a first touch control electrode of the plurality of first touch control electrodes is electrically connected to at least one of the plurality of first touch control signal lines, and a second touch control electrode is electrically connected to at least one of the plurality of second touch control signal lines at the first display area via a connecting portion, wherein the connection portion spans across the first display area and the second display area in the second direction.

17. The display device according to claim 16, further comprising:

an imaging component disposed at the at least one notch.

18. The display device according to claim 16, wherein:

the display panel further comprises a plurality of metal layers, wherein the plurality of touch control signal lines and the connecting portion are disposed at different metal layers.

* * * * *